United States Patent
Mongillo et al.

(10) Patent No.: US 10,125,614 B2
(45) Date of Patent: Nov. 13, 2018

(54) COOLING HOLE ARRANGEMENT FOR ENGINE COMPONENT

(71) Applicant: UNITED TECHNOLOGIES CORPORATION, Hartford, CT (US)

(72) Inventors: Dominic J. Mongillo, West Hartford, CT (US); San Quach, East Hartford, CT (US); Steven Bruce Gautschi, Naugatuck, CT (US); Brandon S. Donnell, Hartford, CT (US); Anita L. Tracy, Middletown, CT (US); Yafet Girma, Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 643 days.

(21) Appl. No.: 14/689,168

(22) Filed: Apr. 17, 2015

(65) Prior Publication Data
US 2015/0300258 A1 Oct. 22, 2015

Related U.S. Application Data

(60) Provisional application No. 61/980,854, filed on Apr. 17, 2014.

(51) Int. Cl.
*F01D 5/18* (2006.01)

(52) U.S. Cl.
CPC .......... *F01D 5/186* (2013.01); *F05D 2250/18* (2013.01); *F05D 2250/31* (2013.01); *F05D 2250/32* (2013.01); *F05D 2260/202* (2013.01); *Y02T 50/676* (2013.01)

(58) Field of Classification Search
USPC ...... 60/39.83, 782, 728, 760, 805, 806, 912; 415/115, 116; 416/95, 96 R, 97 R
See application file for complete search history.

(56) References Cited

U.S. PATENT DOCUMENTS

| | | | |
|---|---|---|---|
| 5,207,556 A * | 5/1993 | Frederick | F01D 5/189 415/115 |
| 5,392,515 A | 2/1995 | Auxier et al. | |
| 5,577,889 A | 11/1996 | Terazaki et al. | |
| 6,984,103 B2 * | 1/2006 | Lee | F01D 5/187 415/115 |
| 7,008,186 B2 | 3/2006 | Heeg et al. | |
| 7,014,424 B2 | 3/2006 | Cunha et al. | |
| 7,249,934 B2 | 7/2007 | Palmer et al. | |
| 7,625,178 B2 * | 12/2009 | Morris | F01D 5/187 29/889.7 |
| 8,137,068 B2 * | 3/2012 | Surace | B22C 7/02 164/44 |
| 8,172,533 B2 * | 5/2012 | Pinero | F01D 5/187 415/115 |

(Continued)

FOREIGN PATENT DOCUMENTS

EP 2230384 A2 9/2010

*Primary Examiner* — Binh Q Tran
(74) *Attorney, Agent, or Firm* — Carlson, Gaskey & Olds, P.C.

(57) ABSTRACT

A component for a gas turbine engine according to an exemplary aspect of this disclosure includes a surface having a plurality of cooling holes. The surface includes a first region and a second region each having a plurality of cooling holes. The cooling holes within the first region are arranged differently than the cooling holes in the second region.

16 Claims, 2 Drawing Sheets

(56) References Cited

U.S. PATENT DOCUMENTS

| | | | | |
|---|---|---|---|---|
| 8,177,507 B2* | 5/2012 | Pietraszkiewicz | ...... | F01D 5/186 |
| | | | | 415/115 |
| 2004/0202542 A1* | 10/2004 | Cunha | ...... | B22C 9/103 |
| | | | | 416/97 R |
| 2009/0126335 A1* | 5/2009 | Fujimoto | ...... | F01D 5/187 |
| | | | | 60/39.83 |
| 2012/0057961 A1* | 3/2012 | Tibbott | ...... | F01D 11/10 |
| | | | | 415/115 |
| 2013/0302141 A1 | 11/2013 | Quach et al. | | |
| 2013/0323080 A1* | 12/2013 | Martin | ...... | F01D 5/186 |
| | | | | 416/97 R |
| 2014/0010632 A1* | 1/2014 | Spangler | ...... | F01D 5/186 |
| | | | | 415/115 |

* cited by examiner

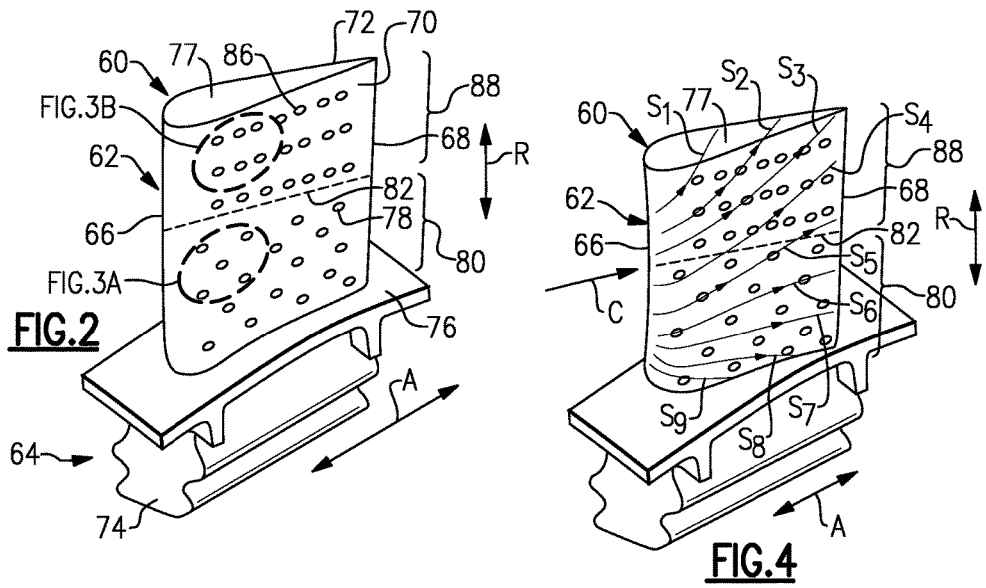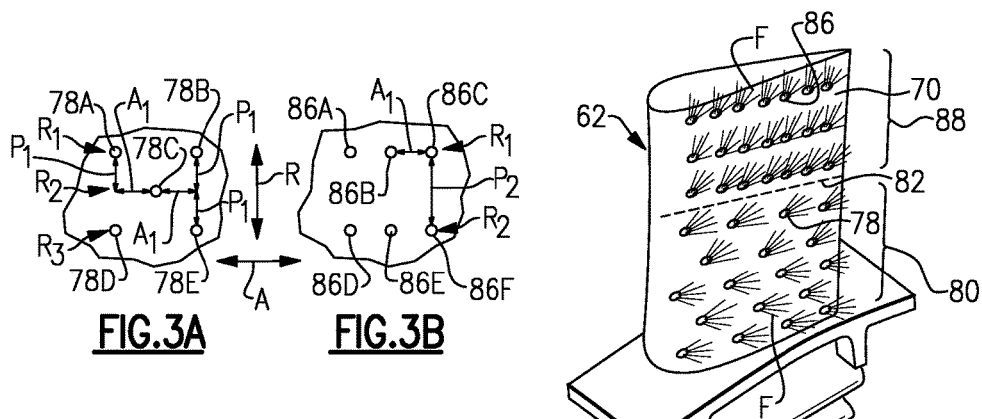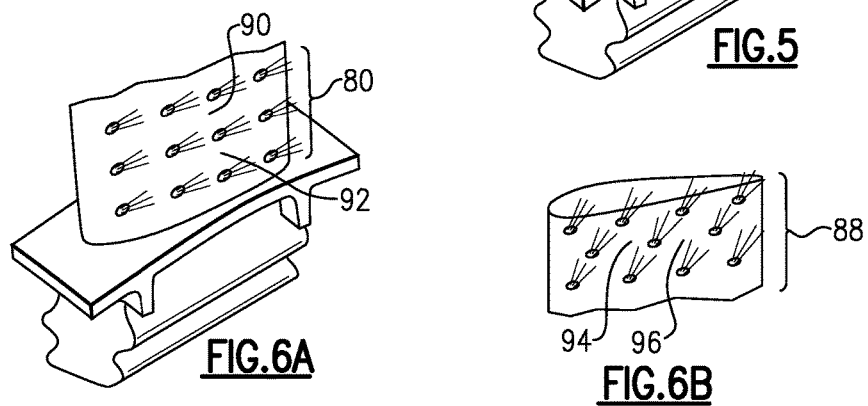

COOLING HOLE ARRANGEMENT FOR ENGINE COMPONENT

STATEMENT REGARDING GOVERNMENT SUPPORT

This invention was made with government support under Contract No. N00019-02-C-3003 awarded by the United States Air Force. The government has certain rights in this invention.

BACKGROUND

Gas turbine engines typically include a compressor section, a combustor section, and a turbine section. During operation, air is pressurized in the compressor section, and mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating arrays of rotating blades and stationary vanes that extend into a core airflow path of the gas turbine engine. Some example engine components, such as turbine blades, include a plurality of cooling holes. During operation of the engine, a cooling fluid exits the cooling holes and creates a film which protects the exterior surface of the component from the relatively hot gases within the core airflow path.

SUMMARY

A component for a gas turbine engine according to an exemplary aspect of this disclosure includes a surface having a plurality of cooling holes. The surface includes a first region and a second region each having a plurality of cooling holes. The cooling holes within the first region are arranged differently than the cooling holes in the second region.

In a further non-limiting embodiment of the foregoing component, the cooling holes within the first region are staggered relative to one another, and the cooling holes within the second region are arranged in-line relative to one another.

In a further non-limiting embodiment of the foregoing component, within the first region the cooling holes are arranged in rows with the cooling holes in adjacent rows being axially misaligned.

In a further non-limiting embodiment of the foregoing component, within the second region the cooling holes are arranged in rows with the cooling holes in adjacent rows being axially aligned.

In a further non-limiting embodiment of the foregoing component, the surface is one of a leading edge, a pressure side, and a suction side of the component.

In a further non-limiting embodiment of the foregoing component, the component is one of a rotor blade, a stator vane, and a blade outer air seal.

In a further non-limiting embodiment of the foregoing component, the component is a rotor blade.

In a further non-limiting embodiment of the foregoing component, the first region extends from a platform of the rotor blade to a radially intermediate location along an airfoil section of the rotor blade, and the second region extends from the radially intermediate location to a tip of the rotor blade.

In a further non-limiting embodiment of the foregoing component, the surface includes only two regions.

In a further non-limiting embodiment of the foregoing component, the surface includes at least two regions.

A gas turbine engine according to another exemplary aspect of this disclosure includes a compressor section, a combustor section, and a turbine section. The engine further includes a component provided within one of the compressor section, the combustor section, and the turbine section. The component includes a surface having a plurality of cooling holes. The surface includes a first region and a second region each having a plurality of cooling holes. Further, the cooling holes within the first region are arranged differently than the cooling holes in the second region.

In a further non-limiting embodiment of the foregoing engine, the cooling holes within the first region are staggered relative to one another, and the cooling holes within the second region are arranged in-line relative to one another.

In a further non-limiting embodiment of the foregoing engine, within the first region, the cooling holes are arranged in rows with the cooling holes in adjacent rows being axially misaligned.

In a further non-limiting embodiment of the foregoing engine, within the second region, the cooling holes are arranged in rows with the cooling holes in adjacent rows being axially aligned.

In a further non-limiting embodiment of the foregoing engine, the surface is one of a leading edge, a pressure side, and a suction side of the component.

In a further non-limiting embodiment of the foregoing engine, the component is one of a rotor blade, a stator vane, and a blade outer air seal.

In a further non-limiting embodiment of the foregoing engine, the component is a rotor blade.

In a further non-limiting embodiment of the foregoing engine, the first region extends from a platform of the rotor blade to a radially intermediate along an airfoil section of the rotor blade, and the second region extends from the radially intermediate location to a tip of the rotor blade.

In a further non-limiting embodiment of the foregoing engine, the surface includes only two regions.

In a further non-limiting embodiment of the foregoing engine, the surface includes at least two regions.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 2 is a perspective view of an example gas turbine engine component.

FIGS. 3A-3B are close-up views of the encircled areas in FIG. 2, and illustrate different cooling hole arrangements.

FIG. 4 is a view of the component of FIG. 2 with a plurality of streamlines illustrated over an airfoil section.

FIG. 5 illustrates a uniform cooling film distribution achieved by the component of FIG. 2.

FIGS. 6A-6B are partial views of engine components with non-uniform cooling distributions.

DETAILED DESCRIPTION

Figure 1:
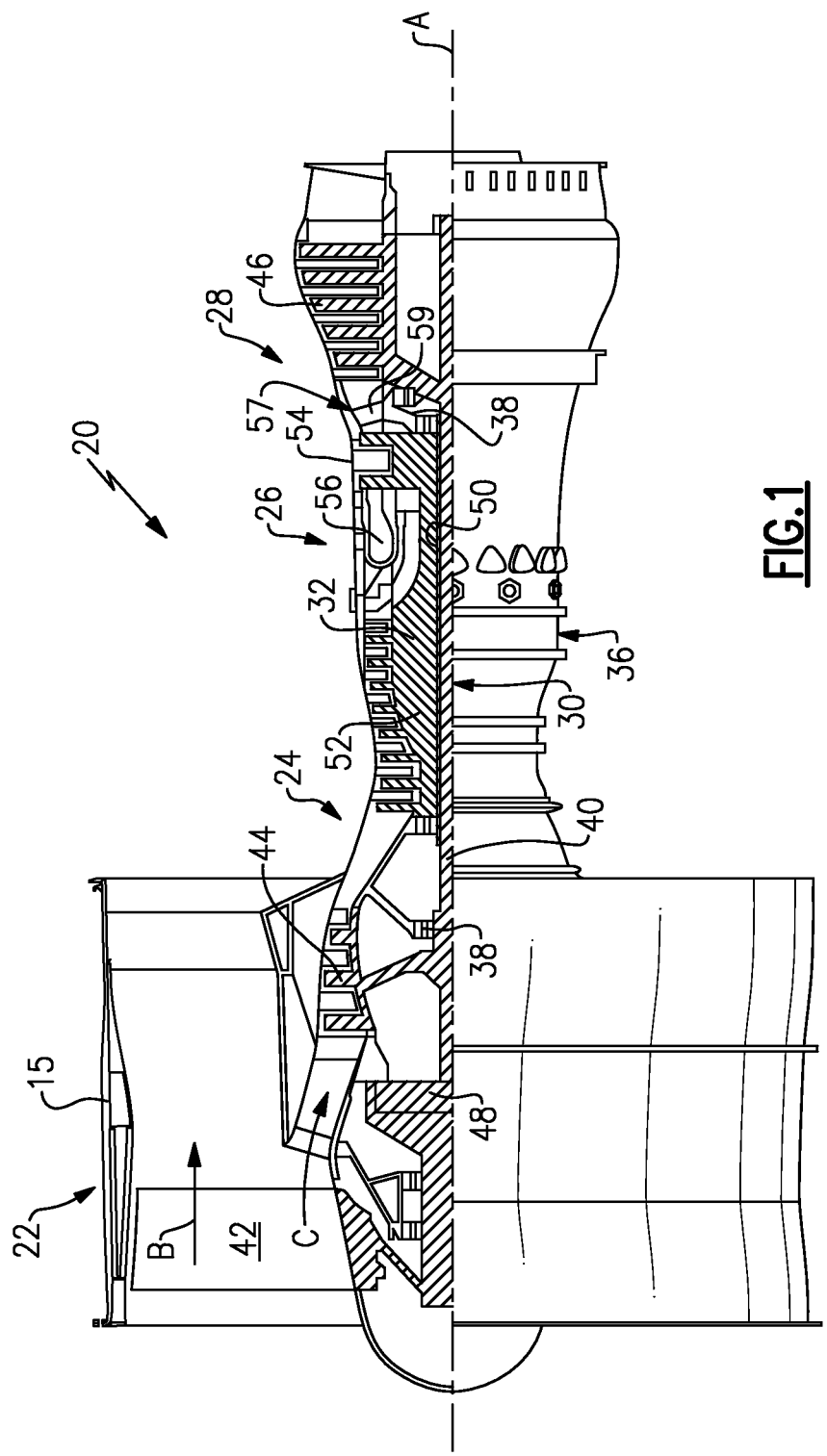
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

FIG. 2 is a perspective view of an example engine component 60. In this example, the engine component 60 is a rotor blade provided within the turbine section 28 of the engine 20 of FIG. 1. It should be understood, however, that this disclosure extends to other engine components, such as stator vanes and blade outer air seals (BOAS). Further, while a turbine blade is illustrated, this disclosure applies to components within other sections of the engine 20.

The engine component 60 includes an airfoil section 62 and an attachment section 64. The airfoil section 62 includes a leading edge 66, a trailing edge 68, and opposed pressure and suction sidewalls 70, 72 extending from the leading edge 66 to the trailing edge 68. The attachment section 64 in this example includes a fir tree root 74, although other types of attachments, such as dovetails, are within the scope of this disclosure. Further, in this example, the component 60 includes a platform 76 between the airfoil section 62 and the attachment section 64. The airfoil section 62 extends radially (in a radial direction R, normal to the engine central longitudinal axis) from the platform 76 to a tip 77 of the component 60.

In this example, the airfoil section 62 includes a plurality of cooling holes for creating a film of cooling fluid F (FIG. 5) on the exterior surface of the component 60. The film of cooling fluid F protects the component 60 from the relatively hot gases within the core airflow path C. In FIG. 2, cooling holes are illustrated only in the pressure sidewall 70 of the airfoil section 62. It should be understood, however, that other surfaces of the engine component 60 may include cooling holes. For example, this disclosure extends to cooling holes provided in the leading edge, the suction side, and the platform 76, as examples.

In this example, the pressure sidewall 70 includes a plurality of staggered cooling holes 78 provided within a first region 80. The first region 80, in this example, is between the platform 76 and a radially intermediate point 82. In this example, the intermediate point 82 is between the platform 76 and the tip 77, at about half the span of airfoil section 62. The intermediate point 82 could be provided at another location along the span of the airfoil section 62 depending on the transition of the streamlines S1-S9 (discussed below) from primarily axial-component flow to radial-component flow. The pressure sidewall 70 further includes a plurality of in-line cooling holes 86 within a second region 88, which is between the intermediate point 82 and the tip 77. In one example, the first region 80 entirely includes staggered cooling holes 78, and the second region 88 entirely includes in-line cooling holes 86.

FIGS. 3A-3B illustrate the arrangement of the staggered cooling holes 78 and the in-line cooling holes 86, respectively. For the purposes of this disclosure, a "staggered" relationship refers to an arrangement where adjacent rows of cooling holes are axially misaligned (e.g., axially spaced-apart from one another). An "in-line" relationship, in this disclosure, means that the cooling holes in adjacent rows are axially aligned.

FIG. 3A illustrates five staggered cooling holes 78A-78E. In this example, the cooling holes 78A-78E are arranged in rows $R_1$-$R_3$. Within the rows $R_1$-$R_3$, the cooling holes 78A-78E are radially aligned with one another. Between adjacent rows, however, the cooling holes 78A-78E are axially misaligned (e.g., axially spaced-apart relative to one another in a direction parallel to the engine central longitudinal axis A).

For instance, in FIG. 3A, cooling holes 78A and 78B are in a first row $R_1$. The cooling holes in the adjacent row $R_2$ are axially misaligned with the cooling holes in the first row $R_1$. In FIG. 3A, only one cooling hole 78C is illustrated in row $R_2$. The cooling hole 78C in row $R_2$ is offset from the cooling holes 78A, 78B in the first row $R_1$ by a distance (or, pitch) $P_1$. Further, the cooling hole 78C is axially spaced-apart from the first cooling hole 78A by a distance $A_1$, and is likewise axially spaced-apart from the second cooling hole 78B by the distance of $A_1$.

The fourth and fifth cooling holes 78D, 78E are in a third row $R_3$, which is radially spaced apart from the cooling hole 78C in the second row $R_2$ by the distance $P_1$. Cooling holes 78D and 78E are also axially spaced-apart from the cooling hole 78C by the distance $A_1$ in the same way as described above relative to cooling holes 78A and 78B. While one particular type of staggered relationship is illustrated, other types of staggered relationships come within the scope of this disclosure.

With reference to FIG. 3B, six in-line cooling holes 86A-86F are illustrated. In FIG. 3B, cooling holes 86A-86C are provided in a first row $R_1$, and cooling holes 86D-86F are provided in a second row $R_2$. Within the rows $R_1$ and $R_2$, the cooling holes 86A-86C and 86D-86F are radially aligned. Further, the cooling holes 86A-86C and 86D-86F are axially spaced apart from an adjacent cooling hole by an axial distance $A_1$, which, in one example, is the same distance as $A_1$ from FIG. 3A. The rows $R_1$ and $R_2$ are radially spaced-apart from one another by a distance (or pitch) $P_2$, which in one example is larger than the distance $P_1$ from FIG. 3A. In one particular example, the distance $P_2$ is twice the distance $P_1$. Further, the first, second, and third cooling holes 86A, 86B, 86C are axially aligned with a respective one of the fourth, fifth, and sixth cooling holes 86D, 86E, 86F from the adjacent row $R_2$.

During operation of the engine 20, the fluid in the core airflow path C follows different streamlines when flowing over the airfoil section 62. A number of streamlines $S_1$-$S_9$ are illustrated over the airfoil section 62 in FIG. 4. The streamlines $S_1$-$S_9$ are illustrated for purposes of example only, and this disclosure is not limited to any particular streamlines. A model can generate streamlines $S_1$-$S_9$ for a particular engine component.

As illustrated in FIG. 4, the streamlines within the first region 80, $S_5$-$S_9$, are generally parallel to engine central longitudinal axis A. The streamlines $S_1$-$S_4$ within the second region 88, on the other hand, are generally inclined relative to the engine central longitudinal axis A toward the tip 77 of the component 60.

To protect the component 60 during engine operation, a flow of cooling fluid F is directed to each of the cooling holes 78, 86. As the cooling fluid F exits the cooling holes 78, 86, the cooling fluid F generally follows the streamlines $S_1$-$S_9$. Given the streamlines $S_1$-$S_9$ illustrated in FIG. 4, the staggered cooling holes 78 within the first region 80 and the in-line cooling holes 86 within the second region 88 provide a uniform film of cooling fluid F. This uniform coverage decreases the thermal gradients experienced by the component 60, and reduces the risks of mechanical fatigue and cracking.

Given the same streamlines $S_1$-$S_9$ in FIG. 4, FIGS. 6A and 6B illustrate alternate cooling hole arrangements, which do not provide the uniform coverage illustrated in FIG. 5. FIG. 6A, for example, illustrates an example where the first region 80 includes in-line cooling holes. In this example, areas 90, 92 between radially adjacent cooling holes would not receive a proportionate level of cooling film coverage, or would not receive any coverage at all. FIG. 6B illustrates an example where the second region 88 includes staggered cooling holes. In this example, areas 94, 96 between axially adjacent cooling holes would not receive a proportionate level of cooling film coverage, or, again, would not receive any cooling film coverage.

While only two regions 80, 88 are needed to provide uniform cooling film coverage in the example of FIGS. 2-5, it should be understood that in other examples a surface may benefit from additional cooling hole regions (e.g., depending on the particular hot gas streamlines experienced by a particular engine component). Further, while the regions 80, 88 essentially radially divide the airfoil section 62, the regions could be defined in other ways, again, depending on the particular application. It should also be understood that while a particular number of cooling holes 78, 86 have been illustrated, any number of cooling holes could be used, and this disclosure is not limited to any particular number of cooling holes.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A component for a gas turbine engine, comprising:
   a surface having a plurality of cooling holes, the surface including a first region and a second region each having a plurality of cooling holes, the cooling holes within the first region being arranged differently than the cooling holes in the second region,
   wherein the component is one of a rotor blade, a stator vane, and a blade outer air seal,
   wherein the first and second regions are on opposite sides of a radially intermediate location of the component, and
   wherein each of the cooling holes within the first region are staggered relative to one another, and wherein each of the cooling holes within the second region are arranged in-line relative to one another.

2. The component as recited in claim 1, wherein, within the first region, the cooling holes are arranged in rows with the cooling holes in adjacent rows being axially misaligned.

3. The component as recited in claim 2, wherein, within the second region, the cooling holes are arranged in rows with the cooling holes in adjacent rows being axially aligned.

4. The component as recited in claim 1, wherein the surface is one of a leading edge, a pressure side, and a suction side of the component.

5. The component as recited in claim 1, wherein the component is a rotor blade.

6. The component as recited in claim 5, wherein the first region extends from a platform of the rotor blade to a radially intermediate location along an airfoil section of the rotor blade, and wherein the second region extends from the radially intermediate location to a tip of the rotor blade.

7. The component as recited in claim 1, wherein the surface includes only two regions.

8. The component as recited in claim 1, wherein the surface includes at least two regions.

9. A gas turbine engine, comprising:
   a compressor section, a combustor section, and a turbine section; and
   a component provided within one of the compressor section, the combustor section, and the turbine section, the component including a surface having a plurality of cooling holes, the surface including a first region and a second region each having a plurality of cooling holes, the cooling holes within the first region being arranged differently than the cooling holes in the second region,
   wherein the component is one of a rotor blade, a stator vane, and a blade outer air seal,
   wherein the first and second regions are on opposite sides of a radially intermediate location of the component, and
   wherein each of the cooling holes within the first region are staggered relative to one another, and wherein each of the cooling holes within the second region are arranged in-line relative to one another.

10. The engine as recited in claim 9, wherein, within the first region, the cooling holes are arranged in rows with the cooling holes in adjacent rows being axially misaligned.

11. The engine as recited in claim 10, wherein, within the second region, the cooling holes are arranged in rows with the cooling holes in adjacent rows being axially aligned.

12. The engine as recited in claim 9, wherein the surface is one of a leading edge, a pressure side, and a suction side of the component.

13. The engine as recited in claim 9, wherein the component is a rotor blade.

14. The engine as recited in claim 13, wherein the first region extends from a platform of the rotor blade to a radially intermediate along an airfoil section of the rotor blade, and wherein the second region extends from the radially intermediate location to a tip of the rotor blade.

15. The engine as recited in claim 9, wherein the surface includes only two regions.

16. The engine as recited in claim 9, wherein the surface includes at least two regions.

\* \* \* \* \*